United States Patent
Bridges et al.

(10) Patent No.: US 7,356,926 B2
(45) Date of Patent: Apr. 15, 2008

(54) REMOVAL TOOL AND METHOD OF REMOVING A BEARING ASSEMBLY

(75) Inventors: Eric B. Bridges, Tempe, AZ (US); Cristopher Frost, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 484 days.

(21) Appl. No.: 10/742,206

(22) Filed: Dec. 18, 2003

(65) Prior Publication Data

US 2005/0132554 A1 Jun. 23, 2005

(51) Int. Cl.
*B23P 19/00* (2006.01)
(52) U.S. Cl. .................. 29/898.07; 29/426.1; 29/426.5; 29/256; 29/258; 29/259; 29/260; 29/261; 29/262
(58) Field of Classification Search .................. 29/724, 29/725, 898.07, 898.08, 426.1, 426.5, 426.6, 29/256, 258, 259, 260, 261, 262
See application file for complete search history.

(56) References Cited

U.S. PATENT DOCUMENTS

| | | | | | |
|---|---|---|---|---|---|
| 1,395,502 | A | * | 11/1921 | Kray | 29/267 |
| 1,473,075 | A | * | 11/1923 | Bates | 29/261 |
| 1,478,964 | A | * | 12/1923 | Klay | 29/261 |
| 1,499,082 | A | * | 6/1924 | Stadler | 29/256 |
| 1,536,553 | A | * | 5/1925 | Anderson, Jr. | 29/255 |
| 1,893,414 | A | * | 1/1933 | Johnson et al. | 29/275 |
| 2,052,534 | A | * | 8/1936 | Quarles | 29/261 |
| 2,170,461 | A | * | 8/1939 | Pepperdine | 81/2 |
| 2,376,721 | A | * | 5/1945 | Piper | 29/261 |
| 2,380,068 | A | | 7/1945 | Patton | |
| 2,835,029 | A | * | 5/1958 | Collins, Sr. | 29/261 |
| 2,971,254 | A | * | 2/1961 | Fairfield | 29/261 |
| 3,651,557 | A | | 3/1972 | Bagley | |
| 3,918,777 | A | * | 11/1975 | Kitchin | 384/528 |
| 4,003,119 | A | * | 1/1977 | Hugh | 29/254 |
| 4,916,791 | A | | 4/1990 | Clouse et al. | |
| 4,940,342 | A | | 7/1990 | Miyazawa et al. | |
| 5,165,156 | A | | 11/1992 | Shultz | |
| 5,251,368 | A | * | 10/1993 | Somerville et al. | 29/255 |
| 5,255,435 | A | | 10/1993 | Shultz | |
| 6,088,898 | A | | 7/2000 | Lundsten | |
| 2002/0168124 | A1 | * | 11/2002 | Dusza | 384/475 |

FOREIGN PATENT DOCUMENTS

GB 1023050 * 3/1966

* cited by examiner

Primary Examiner—Jermie E. Cozart
(74) Attorney, Agent, or Firm—Ingrassia Fisher & Lorenz

(57) ABSTRACT

A compact removal feature comprises a plurality of recesses, such as radius slots, on an inner diameter (ID) of a bearing inner ring. The removal tool can engage the removal feature and remove the entire bearing assembly without damage to the parts. The placement of the removal feature on the bearing inner ring ID allows for a reduction in inner ring length (and weight) while maintaining bearing assembly integrity.

23 Claims, 5 Drawing Sheets

REMOVAL TOOL AND METHOD OF REMOVING A BEARING ASSEMBLY

GOVERNMENT INTERESTS

The invention was made with Government support under contract number N00019-01-C-3002 under the Joint Strike Fighter (JSF) program. The Government has certain rights in this invention.

BACKGROUND OF THE INVENTION

The present invention generally relates to rolling element bearings and, more particularly, to removal features and removal tools for rolling element bearings.

Rolling element bearings have been used extensively in many products such as engines, transmissions, drivetrains, gearboxes, and machine tools. Rolling element bearings may comprise inner and outer bearing rings and bearing balls or rollers there between. The rolling element bearing may be positioned within the product such that the inner diameter of the rolling element bearing is in contact with a bearing shaft. The rolling element bearing may be removed for product disassembly or bearing replacement. Removal methods and removal tools have been described.

Ball bearing pullers that grip an outer diameter edge of the bearing assembly have been used. For a bearing assembly having an inaccessible outer edge, crude methods of removal have included destruction of the bearing with torches, grinders, and chisels. For some applications, these destructive methods may not be desirable and other methods have been disclosed.

A ball bearing puller attachment has been disclosed in U.S. Pat. No. 4,916,791. In the described removal method, links are positioned between the balls of the bearing assembly to grip the inner or outer raceway groove. The bearing assembly is then removed by axial force. For bearings that are interference (press) fitted onto a shaft, thrust overload may damage the bearing. Additionally, the gripping links will damage the bearing raceway rendering the bearing not reusable. Further, the described tool is not useful for bearings having ball separators because the links must fit between the balls to engage the outer race.

Another removal tool has been disclosed in U.S. Pat. No. 6,088,898. The described method positions wedge shaped insertion edges behind the bearing outer races or sleeves press fitted into a housing. The tool requires the bearing to be disassembled with only the outer ring remaining in the housing. Damage to parts may occur due to the high radial forces needed to drive the wedges behind the bearing race/sleeve. Although, the described tool may be used to remove some bearing outer races, it is not useful for bearing assemblies having the inner ring press-fitted onto a shaft. Further, the use of a slide hammer to exert axial force may result in part damage for some applications, such as aerospace bearings.

A removal tool using a threaded shaft (jackscrew) to exert axial force has been disclosed in U.S. Pat. No. 5,255,435. The tool uses a mandrel having drive shoulders to engage the bearing. Although, the tool may be used to remove a press-fitted bearing inner ring or outer ring, it cannot engage and remove a complete bearing assembly. Only a single press-fitted inner or outer ring can remain to allow tool access. Additionally, the shoulders may damage the functional raceway surfaces, rendering the bearing not reusable. The tool cannot engage and safely remove an entire bearing assembly, such as a non-separable conrad ball bearing or a split-inner ring ball bearing, with no damage to the raceways or functional surfaces.

A method for removing an entire bearing assembly has included axially extending the bearing inner ring. A puller groove removal feature is provided on the outward surface (outer diameter) of the extended portion of the inner ring to facilitate removal tool engagement. The disclosed method may be used to safely remove the entire bearing assembly when the inner ring is press-fitted to the shaft and when there is insufficient clearance to fit a removal tool around the outer diameter of the bearing assembly to engage the aft face for removal. Unfortunately, the extended portion of the inner ring adds weight and length to the bearing assembly, which in many designs must be minimized. On high speed rotor systems, such as some gas turbine rotors, excess mass and length can reduce rotordynamic critical speed margin and result in high vibration and bearing loads.

As can be seen, there is a need for improved bearing removal tools and removal methods. Additionally, improved removal methods are needed wherein the entire bearing assembly can be removed without damage to the parts. Bearing removal methods are needed wherein bearing inner ring weight and axial length are minimized. Improved removal tools are needed for removing bearings having ball separators. Further, improved bearing removal tools are needed for removing bearings having press-fitted inner rings and inaccessible outer diameter edges.

SUMMARY OF THE INVENTION

In one aspect of the present invention, a removal apparatus for removing a bearing assembly comprises a removal feature positioned on an inner diameter of a bearing inner ring of the bearing assembly, the removal feature capable of being engaged by a removal tool.

In another aspect of the present invention, a removal tool for a bearing assembly comprises a removal bolt capable of providing an axial force; a removal nut/finger retainer assembly in contact with the removal bolt; at least two finger tabs pivotally attached to the removal nut/finger retainer assembly and capable of engaging inner diameter recesses of the bearing assembly; a shaft seating surface/finger tab guide positioned on an after end of the removal bolt and in contact with the finger tabs; an anti-torque handle in contact with the removal bolt; and a tab engagement retainer in moveable contact with the removal bolt and the finger tabs, the tab engagement retainer capable of urging the finger tabs radially outward and into the inner diameter recesses.

In still another aspect of the present invention, a removal apparatus for an aerospace bearing assembly having bearing bore protuberances comprises a removal bolt; a removal nut/puller sleeve in contact with the removal bolt; a reaction tube radially inward from the removal nut/puller sleeve and radially outward from the removal bolt; and at least two finger tabs in moveable contact with the removal nut/puller sleeve and the reaction tube, the finger tabs capable of engaging removal features on an inner diameter of a bearing inner ring of the aerospace bearing assembly.

In yet another aspect of the present invention, a removal apparatus for a split-inner ring bearing (or other types of rolling element bearings) comprises at least two finger tabs capable of engaging radius slots on an inner diameter of a bearing forward inner ring of the split-inner ring bearing; a tab engagement retainer in moveable contact with the finger tabs, the tab engagement retainer capable of urging the finger tabs radially outward and into the radius slots; and a removal bolt radially inward from and in contact with the tab engagement retainer, the removal bolt capable of providing an axial force, the axial force capable of removing the split-inner ring or other type of rolling element bearing.

In a further aspect of the present invention, a method of removing a bearing assembly comprises the steps of providing a removal feature on an inner diameter of a bearing inner ring of the bearing assembly, the removal feature comprises at least two recesses; providing a removal tool having at least two finger tabs; positioning the removal tool such that the finger tabs are radially inward from and in-line with the recesses; engaging the finger tabs such that the finger tabs are urged radially outward and into the recesses; and rotating a removal bolt of the removal tool such that an axial force is produced and the bearing assembly is removed.

These and other features, aspects and advantages of the present invention will become better understood with reference to the following drawings, description and claims.

BRIEF DESCRIPTION OF THE DRAWINGS

FIG. 2b is a cross-sectional view along line II-II of FIG. 2a;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides removal features and removal tools for rolling element bearings and methods for producing the same. The removal features and removal tools produced according to the present invention may find beneficial use in many industries including aerospace, automotive, and machine tools. The removal features and removal tools of the present invention may be beneficial in applications including manufacturing and repair of automotive and aerospace components, such as engines, drivetrains, transmissions, and gearboxes. The present invention may be beneficial in machine tool applications. This invention may be useful in any rolling element bearing application. It may also be applied to other components such as gears, shaft sleeves, pump elements, seal rotors and other components that are press-fitted onto a shaft.

In one embodiment, the present invention provides a compact removal feature and removal tool for a rolling element bearing. The compact removal feature may comprise a plurality of radius slots positioned on the inner diameter of the bearing inner ring (bearing bore). This is unlike the prior art that positions the removal feature on the outer diameter of the bearing inner ring, requiring axial extension of the bearing inner ring. Because the removal feature of the present invention is in the bearing bore, bearing inner ring axial length may be minimized. Unlike the prior art, an entire bearing assembly having an inaccessible outer diameter, press-fitted inner diameter, and ball separators may be removed without damage to the bearing raceways or extension of the bearing rings.

Figure 1A:
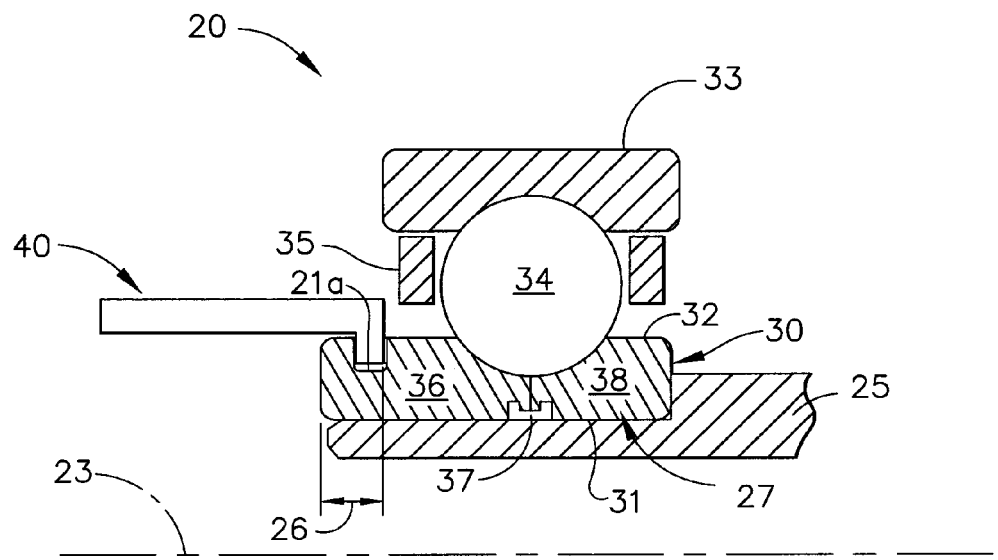
FIG. 1a is a cross-sectional view of a prior art bearing assembly.
Figure 1B:
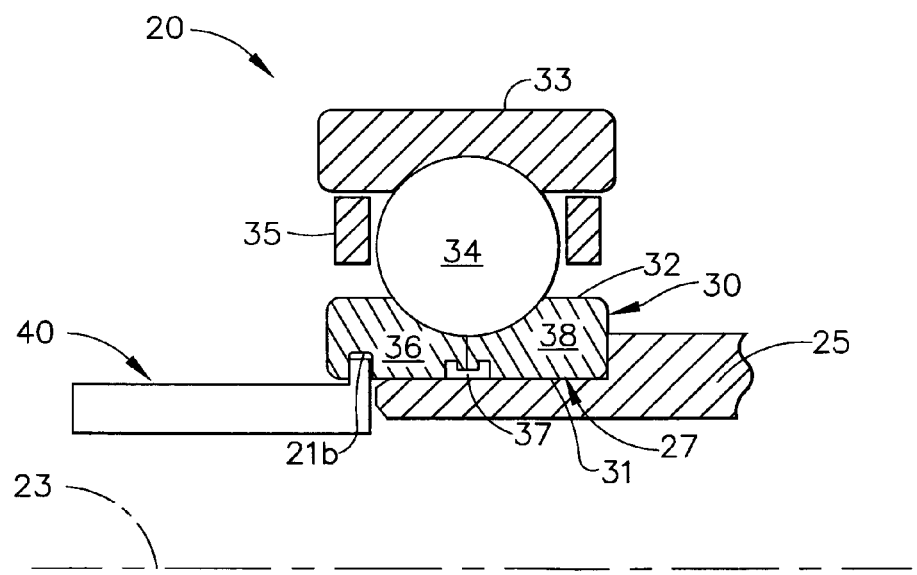
FIG. 1b is a cross-sectional view of a bearing assembly according to one embodiment of the present invention.

A prior art bearing assembly and a bearing assembly of the present invention are shown in FIGS. 1a and 1b, respectively. The bearing assembly 20 may comprise a bearing inner ring 30, a bearing outer ring 33, a bearing ball 34, a ball separator 35, and a removal feature 21a. The bearing inner ring 30 may be interference fitted around a bearing shaft 25. The bearing inner ring 30 may be a split-inner ring 27 and may comprise a bearing forward inner ring 36, a bore clip 37, and a bearing aft inner ring 38. The removal feature 21b of the present invention may be positioned on an inner diameter 31 of the bearing inner ring 30. The removal feature 21b of the present invention may be positioned on a bearing forward inner ring 36 of the bearing inner ring 30. The removal feature 21a of the prior art assembly, seen in FIG. 1a, is positioned on an outer diameter 32 of the bearing inner ring 30. As can be seen, the bearing inner ring 30 of the prior art assembly is axially extended to allow for removal feature 21a engagement by a removal tool 40 (partially shown), which adds weight to the bearing assembly 20.

The present invention may allow for a reduction in bearing inner ring length. When compared with a prior art assembly, as seen in FIG. 1a, the present invention may provide a length reduction 26 of the bearing inner ring 30. As can be appreciated by those skilled in the art, the present invention may reduce the length (and weight) of the bearing inner ring 30 and may result in reduced length for the entire engine or machine.

The removal feature 21b of the present invention may be positioned on the inner diameter 31 of the bearing inner ring 30 and may extend radially outward. The removal feature 21b may comprise a plurality of recesses 24, as seen in FIG. 2a. The removal feature 21b may extend radially outward perpendicular to a bearing bore centerline axis 23. The removal feature 21b may extend radially outward at an angle relative to the bearing bore centerline axis 23. For some applications, the removal feature 21b may extend radially outward and in a forward direction. The dimensions of the removal feature 21b, such as axial width and radial depth, may vary with application. The dimensions may be a function of factors including bearing diameter and amount of diametral interference between inner ring 30 and shaft 25. Useful removal features 21b may have an axial width between about 1 mm and about 4 mm. Useful removal features 21b may have a radial depth between about 1 mm and about 10 mm. The useful dimensions for an application may be determined based on a stress analysis and the dimensions of the particular application. Other factors effecting removal feature 21b dimensions may include removal tool accessibility and removal feature geometry. For example, for an aerospace bearing having a bearing inner ring 30 diameter of 30 mm, the dimensions of each recess 24 of the removal feature 21b may be 2.5 mm radial height (radial depth) by 1.75 mm thick (axial width).

Figure 2B:
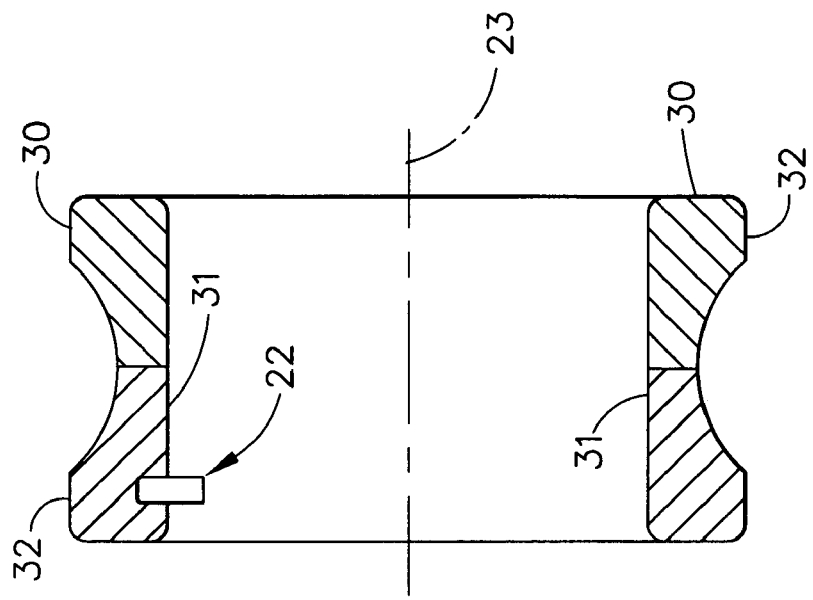
Figure 2A:
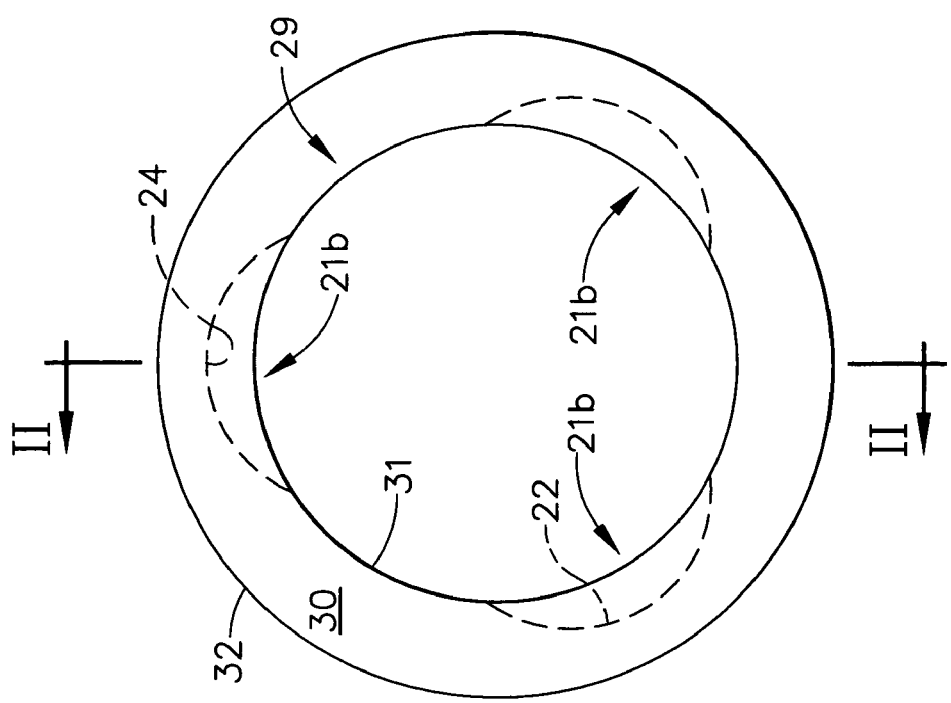
FIG. 2a is a cross-sectional view of a bearing inner ring according to one embodiment of the present invention.

The removal feature 21b of the present invention, as seen in FIGS. 2a and 2b, may comprise a plurality of radius slots 22. The removal feature 21b may be formed during bearing manufacture and may be produced by known manufacturing processes, such as milling and grinding. For some applications, such as applications that experience low axial clamping loads, the removal feature 21b may comprise a 360° groove. For applications that experience high axial clamping loads, such as gas turbine engine main rotor shafting, the removal feature 21b may comprise a plurality of recesses 24, for example the three radius slots 22 seen in FIG. 2a. A removal feature 21b comprising a plurality of recesses 24 may allow for a portion of ring material 29 to remain between adjacent recesses 24, which may increase bearing assembly strength when compared to a 360° groove. The recesses 24 may be evenly spaced on the inner diameter 31 of the bearing inner ring 30. The recesses 24 may be positioned such that they are circumferentially in-line with one another. A useful removal feature 21b may comprise at least two recesses 24. A preferred removal feature 21b may comprise at least three recesses 24. The number of recesses 24 may depend on factors including the diameter and composition of the bearing inner ring 30. The recess 24 may include the radius slot 22, a round opening (not shown), a square opening (not shown), and others. The recess 24 may be any recessed feature capable of engaging a removal tool 40.

Figure 3:
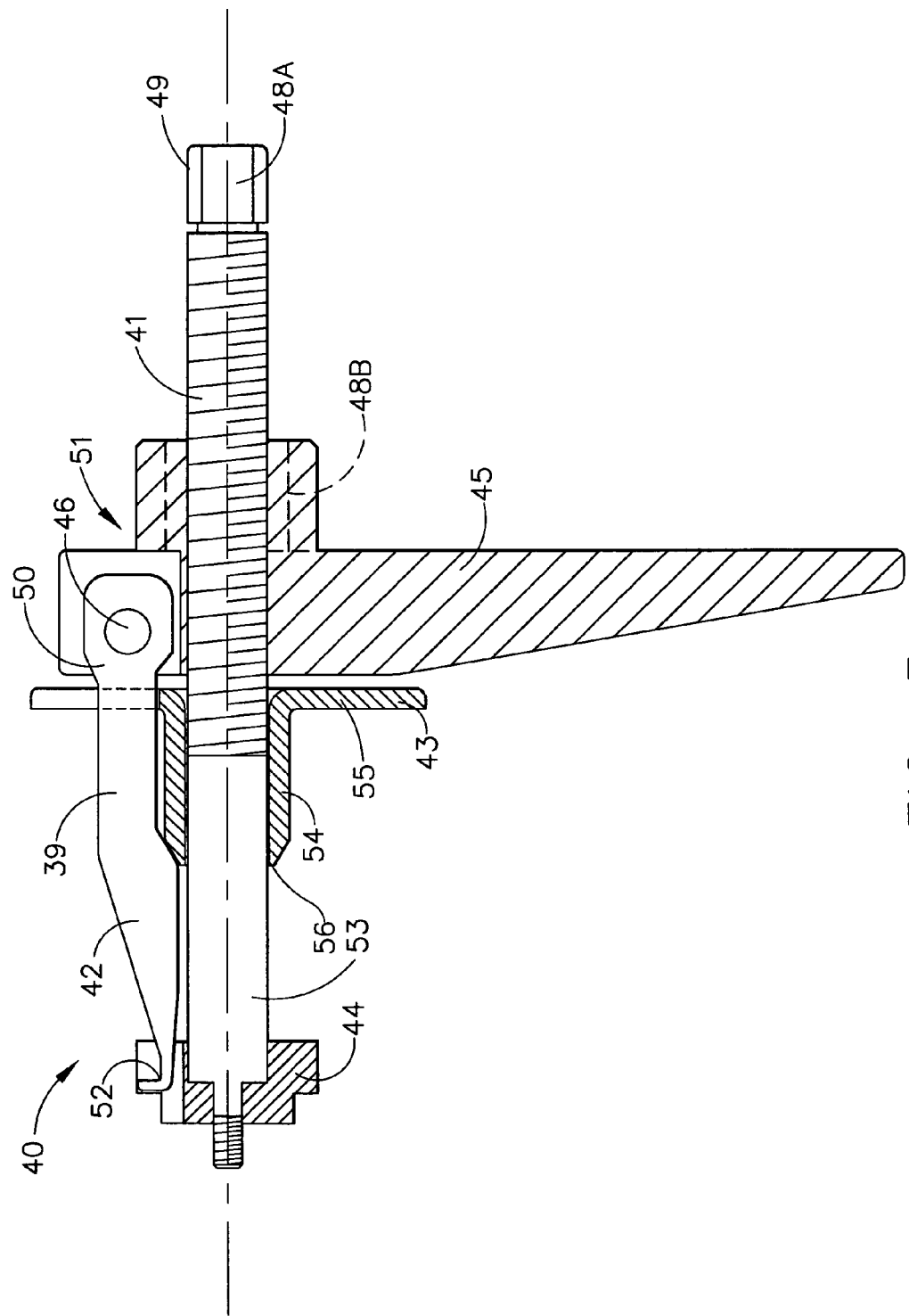
FIG. 3 is a cross-sectional view of a removal tool according to one embodiment of the present invention.

The removal tool 40, as seen in FIG. 3, may be capable of engaging the removal feature 21b and providing an axial force sufficient to overcome the frictional force of the diametral interference fit to remove the bearing assembly 20. The axial force may be provided by a screw thread, such as a removal bolt 41, which is rotated, drawing bearing assembly 20 outward. The removal tool 40 may comprise a plurality of finger tabs 42 that fit the contour of the recesses 24. Once the removal tool 40 is inserted into position, the finger tabs 42 may be engaged by urging the finger tabs 42 radially outward and into the recesses 24. Methods of urging the finger tabs 42 may include using a cam device with a rotating collar and using a screw thread operating a wedge that forces the finger tabs 42 radially outward. After removal tool 40 insertion and finger tab 42 engagement, an axial load may be applied to remove the bearing assembly 20 from the bearing shaft 25.

One embodiment of the removal tool 40, as seen in FIG. 3, may comprise a removal bolt 41, removal nut/finger retainer assembly 51, finger tab 42, tab engagement retainer 43, shaft seating surface/finger tab guide 44, anti-torque handle 45, and pin 46. The removal bolt 41 may have bolt wrench flats 48a at a forward end 49. The bolt wrench flats 48a may be wrench flats and may be used for manual rotation of the removal bolt 40 to supply axial force for bearing removal. Alternately, the removal bolt 40 may have a cross-pin (not shown) for use in providing the torque used to apply axial force. The anti-torque handle 45 may be used to hold the removal tool 40 during bearing removal. Anti-torque handles 45 having any known handle shape may be useful with the present invention. The anti-torque handle 45 may be useful in positioning the removal tool 40 such that the finger tabs 42 may engage the removal feature 21b. Alternatively, assembly wrench flats 48b on the removal nut/finger retainer assembly 51 can be used in lieu of the anti-torque handle 45. The assembly wrench flats 48b may be wrench flats and may differ from the bolt wrench flats 48a in their position on the removal tool 40.

Figure 4:
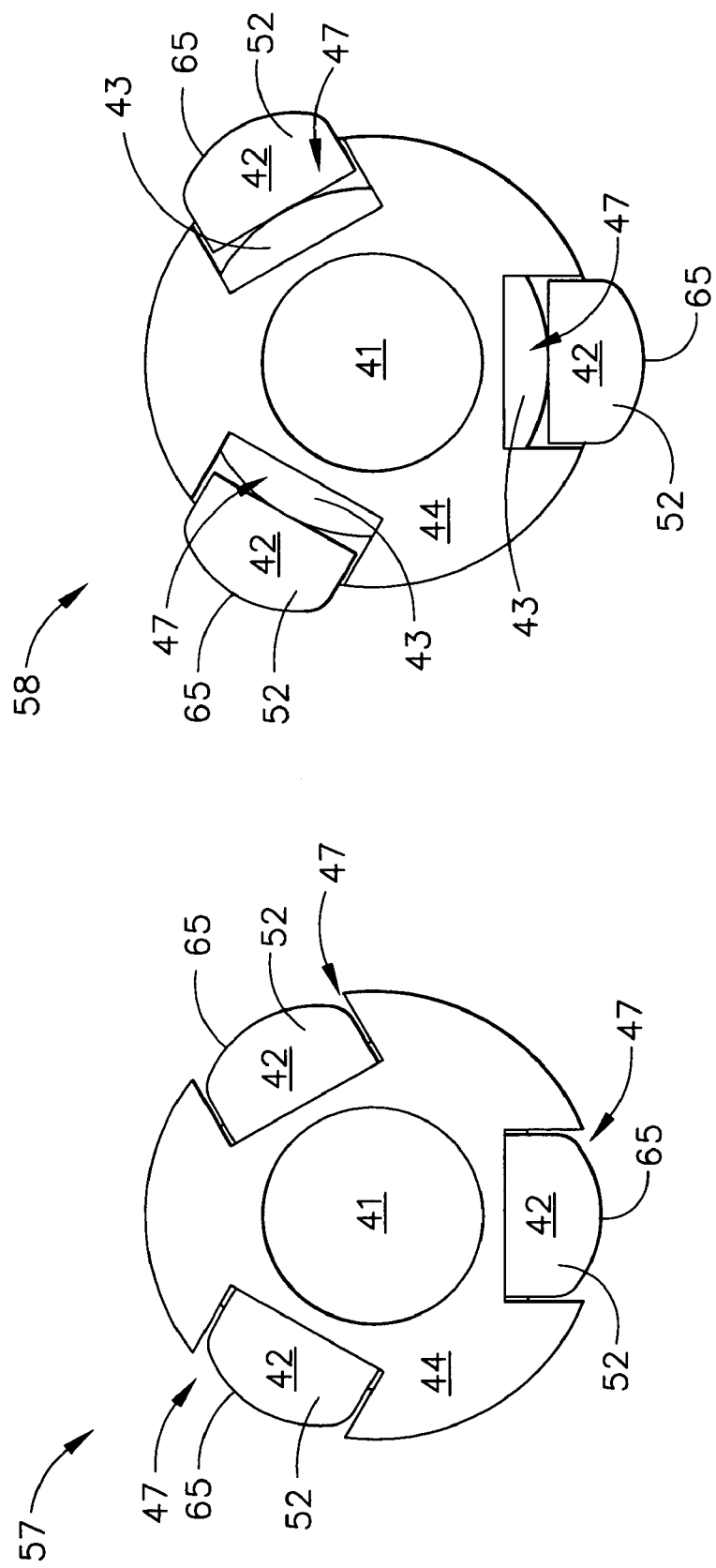
FIG. 4a is a cross-sectional view of shaft seating surface/finger tab guide of an unengaged removal tool according to one embodiment of the present invention.
FIG. 4b is a cross-sectional view of a shaft seating surface/finger tab guide of an engaged removal tool according to one embodiment of the present invention.

The removal tool 40 may have a plurality of finger tabs 42. The number of finger tabs 42 may equal the number of recesses 24 of the removal feature 21b. The finger tab 42 may be an elongated member 39 having a first tab portion 50 and a second tab portion 52, as seen in FIG. 3. The first tab portion 50 may be capable of being pivotally attached to a removal nut/finger retainer assembly 51 by pin 46. The removal nut/finger retainer assembly 51 may provide for axial movement of the finger tabs 42 while the finger tabs 42 are maintained in an engaged position. The second tab portion 52 may be capable of engaging the recess 24 of the removal feature 21b. The second tab portion 52 may have an axial width about equal to the axial width of the removal feature 21b. The second tab portion 52 may have a radial length about equal to the radial depth of the removal feature 21b. Useful second tab portions 52 may have an axial width between about 1 mm and about 5 mm. Useful second tab portions 52 may have a radial length between about 1 mm and about 10 mm. The second tab portion 52 may have a shape complementary to the shape of the recess 24. For example, when the removal feature 21b comprises a radius slot 22, the second tab portion 52 may be an arc-shaped portion 65, as shown in FIGS. 4a and 4b. The arc-shaped portion 65 may be capable of fitting within a radius slot 22. When the removal feature 21b comprises a round opening, the second tab portion 52 may be a pin-shaped portion (not shown). The second tab portion 52 may fit within a tab opening 47 of the shaft seating surface/finger tab guide 44.

The shaft seating surface/finger tab guide 44 may be positioned on an aft end 53 of a removal bolt 41. The shaft seating surface/finger tab guide 44, as seen in FIGS. 4a and 4b, may comprise a plurality of tab openings 47. The second tab portion 52 of the finger tab 42 may fit within the tab opening 47. The number of tab openings 47 may equal the number of finger tabs 42. The tab opening 47 may be capable of holding the second tab portion 52 in alignment with the recess 24 of the removal feature 21b. During operation, the tab engagement retainer 43 may be manually slid along the removal bolt 41, urging the second tab portion 52 radially outward and into the recess 24.

The tab engagement retainer 43 may comprise a cylindrical member 54 and a retainer flange 55. The removal bolt 41 may fit within the cylindrical member 54. The cylindrical member 54 may be capable of sliding along the removal bolt 41. A retainer flange 55 may be positioned at one end of the cylindrical member 54. The retainer flange 55 may be used to manually slide the tab engagement retainer 43 towards the after end 53 of the removal bolt 41 such that the second tab portion 52 is urged radially outward and into the recess 24. The retainer flange 55 may be shaped such that pivoting of the finger tab 42 is not prevented. For example, the retainer flange 55 may be annular and may have an outer diameter slot opening (not shown) to accommodate the pivoting of the finger tab 42. A slanted feature 56 may be positioned at the other end of the cylindrical member 54 to facilitate the radially outward urging of the second tab portion 52. FIGS. 4a and 4b depict cross-sectional views of the shaft seating surface/finger tab guide 44 of the removal tool 40 as viewed from the after end 53. In FIG. 4a, the removal tool 40 is in an unengaged position 57. In FIG. 4b, the removal tool 40 is in an engaged position 58.

A bearing assembly 20 having the removal feature 21b of the present invention may be removed using the removal tool 40. The removal tool 40 may be positioned such that the second tab portions 52 are in-line with the recesses 24. The tab engagement retainer 43 may be slid towards the after end 53 and may urge the second tab portions 52 into the recesses 24. The removal bolt 41 may be rotated using a wrench to provide the axial force to remove the bearing assembly 20.

Figure 5:
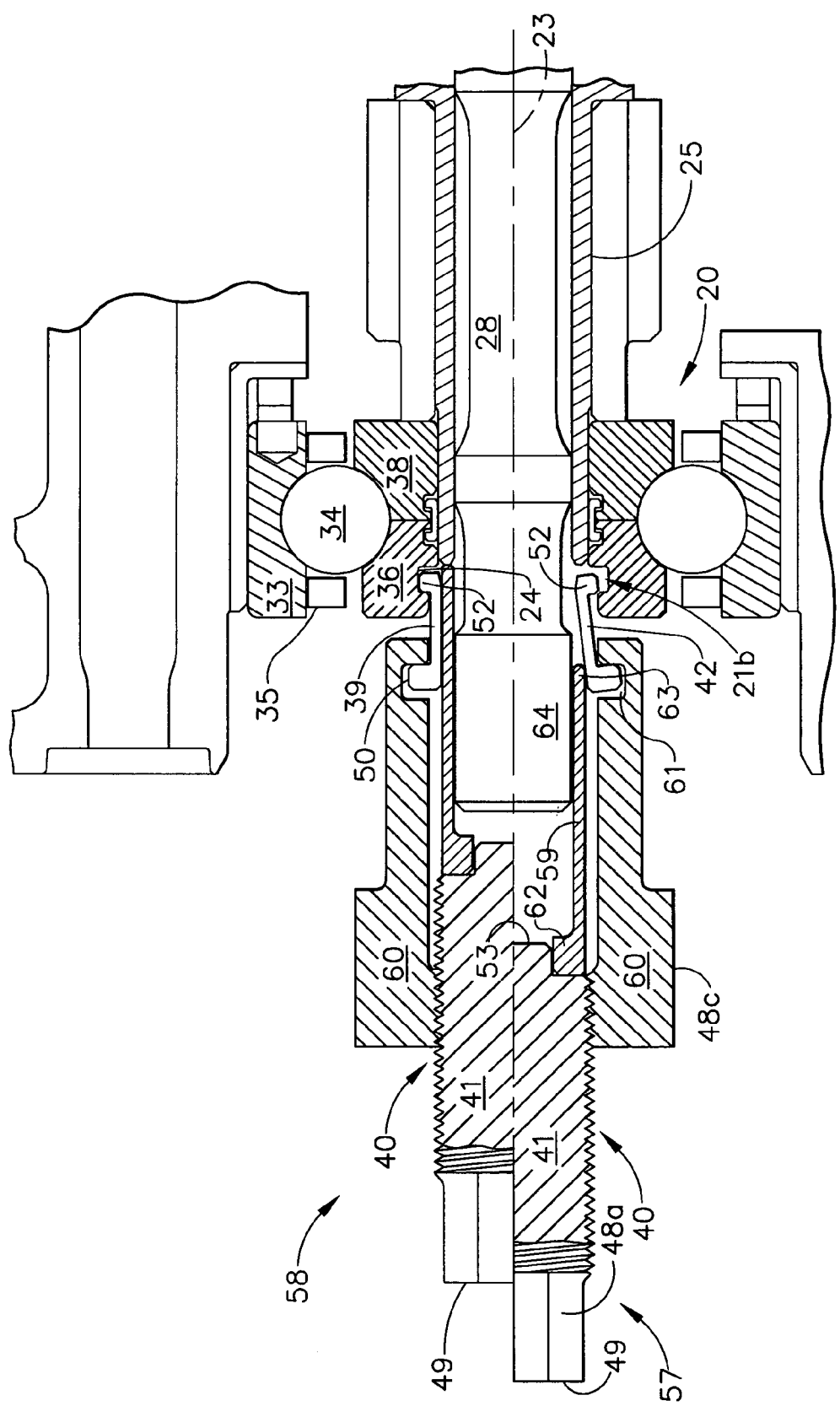
FIG. 5 is a cross-sectional view of a removal tool according to another embodiment of the present invention.

Another embodiment of the removal tool 40 is shown in FIG. 5. This embodiment may be useful in applications where there is a protuberance 64, such as a portion of tie bolt 28, in the bore of the bearing shaft 25. The removal tool 40 is depicted in an engaged position 58 above the bearing bore centerline axis 23 and in an unengaged position 57 below the bearing bore centerline axis 23. The removal tool 40 may comprise a removal bolt 41, finger tab 42, reaction tube 59, and a removal nut/puller sleeve 60. The removal bolt 41 may have bolt wrench flats 48a at a forward end 49. The bolt wrench flats 48a may be used during manual turning of the removal bolt 40 to supply axial force for bearing removal. Alternately, the removal bolt 40 may have a cross-pin (not shown) for use in providing the torque used to apply axial force.

The removal tool 40 may have a plurality of finger tabs 42. The number of finger tabs 42 may equal the number of recesses 24 of the removal feature 21b. The finger tab 42 may be an elongated member 39 having a first tab portion 50 and a second tab portion 52. The first tab portion 50 may be in moveable contact with the removal nut/puller sleeve 60 and the reaction tube 59. The second tab portion 52 may be capable of engaging a recess 24 of a removal feature 21b. The second tab portion 52 may have a shape complementary to the shape of the recess 24.

The removal nut/puller sleeve 60 may be cylindrical and may surround the removal bolt 41. The removal nut/puller sleeve 60 may have sleeve wrench flats 48c on the outer diameter of one end and finger tab holders 61 on the inner diameter of the other end. The sleeve wrench flats 48c may be used to manually hold the removal nut/puller sleeve 60 during bearing assembly removal. The finger tab holders 61 of the removal nut/puller sleeve 60 may comprise a recessed area capable of receiving the first tab portion 50 of finger tab 42. The finger tab holder 61 may be capable of positioning the first tab portion 50 such that the second tab portion 52 is in alignment with a recess 24 of the removal feature 21b. The first tab portion 50 may be in moveable contact with the finger tab holders 61 and the reaction tube 59.

The reaction tube 59 may be cylindrical and may be positioned radially inward from the removal nut/puller sleeve 60. The reaction tube 59 may be capable of being moved axially through the removal nut/puller sleeve 60 by the removal bolt 41. The front end 62 of the reaction tube 59 may be in contact with the after end 53 of removal bolt 41. The removal nut/puller sleeve 60 may be capable of allowing for axial movement of the removal bolt 41 while the finger tabs 42 are maintained in an engaged position 58, and axial bearing removal load is reacted off of the after end 53 of removal bolt 41 and into reaction tube 59. The outer diameter of the back end 63 of the reaction tube 59 may be in movable contact with the finger tab 42. The reaction tube 59 may be slid towards the second tab portion 52 such that the second tab portion 52 may be urged radially outward and into a recess 24 of the removal feature 21b, as seen in FIG. 5.

A bearing assembly 20 having a protuberance 64 inside bearing shaft 25 may be removed using a removal tool 40 of the present invention. The removal tool 40 may be positioned such that the protuberance 64 is radially inward from the reaction tube 59 and the removal nut/puller sleeve 60 and such that the second tab portions 52 are radially in-line with the recesses 24. The reaction tube 59 may be slid axially to urge the second tab portions 52 into the recesses 24. The removal bolt 41 may be rotated using a wrench to provide the axial force to remove the bearing assembly 20.

The axial length of the bearing shaft 25 may be reduced to allow for access of the removal feature 21b by the removal tool 40, as best seen in FIG. 1b. The bearing shaft 25 may be slotted to allow for access for the removal tool 40. For many applications, such as gas turbine engine and other thrust bearing applications, the reduction in bearing shaft 25 length may not adversely affect the bearing assembly 20 because the loads on the bearing may be primarily carried by the bearing aft inner ring 38. Although, the forward end of the bearing shaft 25 may be shorter, the bearing shaft 25 may provide sufficient piloting and radial support under the raceway to carry the full bearing loads. The bearing aft inner ring 38 may be fully supported by the bearing shaft 25.

As can be appreciated by those skilled in the art, the present invention provides improved removal features and removal tools for rolling element bearings and methods for their production. A removal feature allowing for a reduction in bearing inner ring length is provided. Also provided are removal tools for removing entire bearing assemblies without part damage. Further, a removal tool capable of removing a bearing having a press-fitted inner ring, inaccessible outer diameter edge, and a shaft bore protuberance is provided.

It should be understood, of course, that the foregoing relates to preferred embodiments of the invention and that modifications may be made without departing from the spirit and scope of the invention as set forth in the following claims.

We claim:

1. A removal assembly for removing a bearing assembly including a bearing inner ring having an inner diameter, the removal assembly comprising:
    a removal feature formed on the inner diameter of the bearing inner ring, the removal feature comprising a plurality of recesses; and;
    a removal tool including:
        a removal bolt capable of providing an axial force;
        a removal nut/finger retainer assembly in contact with said removal bolt;
        at least two finger tabs, each said finger tab pivotally attached to said removal nut/finger retainer assembly and capable of engaging said removal feature;
        a shaft seating surface/finger tab guide positioned on an aft end of said removal bolt and in contact with each said finger tab; and
        a tab engagement retainer in moveable contact with said removal bolt and each said finger tab, said tab engagement retainer capable of urging each said finger tab radially outward and into said removal feature.

2. The removal assembly of claim 1, wherein said removal feature comprises a plurality of recesses.

3. The removal assembly of claim 2, wherein each of said recesses comprises a radius slot.

4. The removal assembly of claim 1, wherein said removal feature comprises three radius slots.

5. The removal assembly of claim 1, wherein each said finger tab comprises an elongated member having an arc-shaped portion.

6. The removal assembly of claim 1, wherein said removal feature has a radial depth between about 1 mm and about 10 mm.

7. The removal assembly of claim 1, wherein said bearing inner ring comprises a split-inner ring including a forward inner ring and an aft inner ring, and wherein said removal feature is positioned on an inner diameter of said forward inner ring.

8. The removal assembly of claim 1, wherein said removal tool has a removal bolt with bolt wrench flats for providing an axial force.

9. The removal assembly of claim 1, wherein said removal feature has an axial width between about 1 mm and about 4 mm.

10. A removal tool for a bearing assembly comprising:
a removal bolt capable of providing an axial force;
a removal nut/finger retainer assembly in contact with said removal bolt;
at least two finger tabs, each said finger tab pivotally attached to said removal nut/finger retainer assembly and capable of engaging an inner diameter removal feature of said bearing assembly;
a shaft seating surface/finger tab guide positioned on an aft end of said removal bolt and in contact with each said finger tab; and
a tab engagement retainer in moveable contact with said removal bolt and each said finger tab, said tab engagement retainer capable of urging each said finger tab radially outward and into said inner diameter removal feature.

11. The removal tool of claim 10, wherein said removal bolt has bolt wrench flats at a forward end of said removal bolt.

12. The removal tool of claim 10, further comprising an anti-torque handle in contact with said removal bolt.

13. The removal tool of claim 10, wherein said removal nut/finger retainer assembly has assembly wrench flats.

14. The removal tool of claim 10, wherein said inner diameter removal feature comprises a plurality of radius slots.

15. The removal tool of claim 10, wherein said tab engagement retainer comprises a cylindrical member and a retainer flange extending radially outward from said cylindrical member.

16. The removal tool of claim 10, wherein each said finger tab comprises an elongated member having a first tab portion and a second tab portion.

17. The removal tool of claim 16, wherein said shaft seating surface/finger tab guide has at least two tab openings, each said tab opening capable of receiving one said second tab portion.

18. The removal tool of claim 16, wherein said second tab portion has an axial width between about 1 mm and about 5 mm.

19. The removal tool of claim 16, wherein said second tab portion has a radial length between about 1 mm and about 10 mm.

20. A method of removing a bearing assembly comprising the steps of:
providing a removal feature on an inner diameter of a bearing inner ring of said bearing assembly, said removal feature comprises at least two recesses;
providing a removal tool having a removal bolt, at least two finger tabs disposed radially outwardly from said removal bolt, and a shaft seating surface/finger tab guide positioned on an aft end of said removal bolt and in contact with each said finger tab;
positioning said removal tool such that each said finger tab is radially inward from and in-line with said removal feature;
engaging said at least two finger tabs such that said finger tabs are urged radially outward and into said removal feature and manually sliding a tab engagement retainer of said removal tool; and
providing an axial force to remove said bearing assembly.

21. The method of claim 20, wherein each said recess comprises a radius slot.

22. The method of claim 20, wherein said step of providing a removal feature comprises milling a plurality of radius slots during the manufacturing of said bearing assembly.

23. The method of claim 20, wherein said step of providing an axial force comprises rotating a removal bolt of said removal tool such that said axial force is produced and said bearing assembly is removed.

* * * * *